United States Patent [19]

Daimon et al.

[11] Patent Number: 4,895,887

[45] Date of Patent: Jan. 23, 1990

[54] COATING COMPOSITION AND WHEEL COATED WITH THE SAME FOR VEHICLES

[75] Inventors: Yasuo Daimon, Tondabayashi; Takashi Ban, Yamatotakada; Akio Fujinaka, Kakegawa; Kimio Ochiai, Ogasa, all of Japan

[73] Assignees: Osaka Yuki Kagaku Kogyo Kabushiki Kaisha, Osaka; Asahi Malleable Iron Co., Ltd., Shizuoka, both of Japan

[21] Appl. No.: 228,145

[22] Filed: Aug. 4, 1988

[30] Foreign Application Priority Data

Sep. 9, 1987 [JP] Japan ................................ 62-225839

[51] Int. Cl.$^4$ ............................................. C08K 5/24
[52] U.S. Cl. ................................ 524/265; 301/5 R; 428/447; 428/450; 524/766; 524/730
[58] Field of Search ............... 524/265, 858, 766, 770; 428/447, 450; 301/5

[56] References Cited

U.S. PATENT DOCUMENTS 3,986,997  10/1976  Clark .
4,197,230   4/1980  Barney et al. .
4,435,219   3/1984  Greigger ........................... 428/447
4,439,494   3/1984  Olson ................................. 524/265
4,732,787   3/1988  Vantillard et al. ................. 524/265

FOREIGN PATENT DOCUMENTS 52-39691  10/1977  Japan .
54-87736   7/1979  Japan .
55-94971   7/1980  Japan .

Primary Examiner—Joseph L. Schofer
Assistant Examiner—Mark Sweet
Attorney, Agent, or Firm—Armstrong, Nikaido, Marmelstein, Kubovcik & Murray

[57] ABSTRACT

A coating composition comprising a colloidal silica, a partial condensate of organoalkoxysilane hydrolyzate, a polymer or a copolymer of unsaturated ethylenic monomers, a surface active agent and glycol derivatives, which is coated on a wheel for vehicles shows excellent properties such as adhesive property, filiform corrosion resistance, stain resistance, weather-resistance and impact resistance. A wheel coated with the coating composition for vehicles also shows excellent properties such as filiform corrosion resistance, stain resistance, weather-resistance and impact resistance.

7 Claims, No Drawings

COATING COMPOSITION AND WHEEL COATED WITH THE SAME FOR VEHICLES

BACKGROUND OF THE INVENTION

The present invention relates to a coating composition and a wheel on which the coating composition is coated for vehicles, and more particularly to a coating composition being excellent in adhesive property to a substrate, corrosion resistance particularly in filiform corrosion, stain resistance, weather-resistance, scratch resistance and impact resistance, and a wheel for vehicles having excellent film properties, which is produces by applying the coating composition to the surface of the wheel.

(A) Organic resin paint

Heretofore, an organic resin paint such as acrylic resin paint, epoxy reisn paint or urethane resin paint is coated on the surface of a wheel for vehicles for the purpose of improving the appearance and protecting the wheel. However, many processes and costs are required for forming a paint film having corrosion resistance with the organic resin paint on the wheel since the organic resin paint should be recoated on the wheel for vehicles to form a thick film having a thickness of about 100 μm.

The organic resin paint is poor in corrosion resistance. Accordingly, when the paint is coated on the surface of the wheel for vehicles made of aluminium alloy, there is a problem that filiform corrosion generates on the surface. In other words, filiform corrosion generates on the surface of the wheel for vehicles vehicles made of aluminium alloy, on which a clear paint of organic resin is coated, with the passage of time owing mainly to the conditions of a surface of road. In order to prevent the filiform corrosion, many studies have been made, however, there have not yet been produced organic resin paints having filiform corrosion resistance.

The organic resin paint also has the defects that the formed paint film is easily scratched as well as that stains scattered from brake pads and the like are adhered to the surface of the paint film.

(B) Inorganic paint (alkaline metal silicate paint)

The application of an alkaline metal silicate paint, which is one of inorganic paints, to a wheel for vehicles has been studied in order to solve the above-mentioned problems of the organic resin paint. As the results, it has been found that the filiform corrosion resistance, stain resistance and scratch resistance are improved. However, the alkaline metal silicate paint could not been applied to practical uses since there are some problems that the workability for coating of the alkaline metal silicate paint is wrong, that the formed paint film is easily cracked owing to the thermal expansion or thermal shrinkage and that efflorescence generates in the paint film owing to the alkaline metal remained in the paint film.

(C) Inorganic-organic composite paint (silica-organo silane paint)

A silica-organo silane paint, which is one of inorganic-organic composite paints, has been developed as a coating material which is mainly applied to the surface of a material made of organic resin such as polymethyl methacrylate or polycarbonate to provide a paint film having abrasion resistant.

The silica-organo silane paint has been proposed, for instance, in Japanese Examined Patent Publication No. 39691/1977, Japanese Unexamined Patent Publication No. 87736/1979, Japanese Unexamined Patent Publication No. 94971/1980, U.S. Pat. No. 3,986,997, and the like.

When these paints are applied as protective coats of the surface of the wheel for vehicles, it has been found that the paints are effective in filiform corrosion resistance, stain resistance and scratch resistance as well as the alkaline metal silicate paint is effective therein. However, the paints have the following problems.

(i) A thick paint film is not formed with the paints. The adequate thickness of the paint film, when the paints are employed, is not more than 10 μm. When the thickness is more than 10 μm, cracking generates in the paint film owing to thermal shrinkage, accelerated weathering test, and the like. However, it is generally required that the thickness of the protective paint film formed on the surface of the wheel for vehicles is not less than about 20 μm in order to impart corrosion resistance to the wheel. In particular, it is important to control the thickness of the paint film coated on the surface of wheel for vehicles of which substrate is a cast of aluminium alloy. When the thickness of the paint film is less than 20 μm, pin holes easily generate in the paint film and there is a problem in corrosion resistance since the surface of the cast is rough and has many blowholes.

(ii) The paint film formed with the paints is a hard glassy film having a pencil hardness of 6H to 9H and is poor in impact resistance. When a vehicle equipped with a wheel made of aluminium alloy, on which the paint is coated, is subjected to a running test, many chippings which are produced by striking the wheel with sands or small stones have been found on the paint film.

As mentioned above, there has not yet been developed a paint having sufficient properties which are required for a paint which is coated to a wheel for vehicles.

SUMMARY OF THE INVENTION

The object of the present invention is to solve the above-mentioned problems and to provide a coating composition being excellent in corrosion resistance particularly in filiform corrosion, stain resistance, weather-resistance, scratch resistance and impact resistance and being effective for protecting the surface of the wheel for vehicles, and a wheel for vehicles having excellent paint film properties, which is produced by coating the wheel with the coating composition.

In accordance with the present invention, there are provided a coating composition comprising (a) 20 to 60% by weight of colloidal silica,
(b) 20 to 60% by weight of a partial condensate of organoalkoxysilane hydrolyzate,
(c) 5 to 40% by weight of a polymer or a copolymer of unsaturated ethylenic monomers,
(d) 0.1 to 5.0% by weight of a surface active agent and
(e) 150 to 550% by weight of a solvent containing glycol derivatives as an indispensable component, each of the components (a), (b), (c), (d) and (e) being based on the total solid components of the coating composition is coated.

These and other objects of the present invention will be apparent to one skilled in the art upon consideration of the following description and appended claims.

DETAILED DESCRIPTION

The coating composition of the present invention is prepared by dispersing and mixing the mixture obtained by adding a polymer or a copolymer of unsaturated ethylenic monomers, a surface active agent and a solvent containing glycol derivatives as an indispensable component to a dispersion of a partial condensate of colloidal silica-organoalkoxysilane hydrolyzate which is prepared by hydrolyzing an organoalkoxysilane represented by the general formula: $R^1Si(OR^2)_3$, where $R^1$ is a group selected from the group consisting of alkyl group having 1 to 3 carbon atoms, vinyl group, 3,4-epoxycyclohexylethyl group, γ-glycidoxypropyl group, γ-methacryloxypropyl group, γ-mercaptopropyl group and γ-chloropropyl group, and $R^2$ is an alkyl group having 1 to 3 carbon atoms or aryl group, or a mixture of the organoalkoxysilanes in a dispersion mixture of acidic aqueous colloidal silica and non-aqueous colloidal silica.

The colloidal silica (a) used in the present invention is colloidal silica prepared by dispersing a silicic anhydride having a high molecular weight into water, an organic solvent such as alcohol or a combination of the two. The colloidal silica (a) is preferably used in the form of a mixture of aqueous colloidal silica and non-aqueous colloidal silica in order to improve storage stability of the coating composition. Further, it is preferable that the mixture of the aqueous colloidal silica and the non-aquous colloidal silica contains at least 20% by weight of the non-aqueous colloidal silica. When the content of the non-aqueous colloidal silica is less than 20% by weight, the storage stability of the coating composition is lowered.

The average particle size of the colloidal silica (a) is preferably within a range of 5 to 150 mμm, more preferably within a range of 5 to 30 mμm. When the average particle size is less than 5 mμm, the coating composition is not effective for practical uses, and when the average particle size is more than 150 mμm.

It is preferable that the pH of the dispersion of the colloidal silica (a) is within a range of 2 to 4. When the composition is basic, the storage stability of the composition is lowered. It is preferable that the content of silica in the dispersion of colloidal silica is within a range of 10 to 50% by weight.

The above-mentioned dispersion of colloidal silica is well-known in the field of art and is commercially available as aqueous colloidal silica prepared by dispersing silicic anhydride having a high molecular weight into water and and non-aqueous colloidal silica prepared by dispersing silica anhydride having a high molecular weight into alcoholic solvent.

It is preferable that the content of the coloidal silica is 20 to 60% by weight on the total amount of the solid components contained in the coating composition. When the content of the colloidal silica is less than 20% be weight, the hardness of the paint film is lowered, and when the content is more than 60% by weight, the impact resistance of the paint film is lowered.

The partial condensate of organoalkoxysilane hydrolyzate is prepared by hydrolyzing the organoalkoxysiline represented by the general formula: $R^1 Si(OR^2)_3$, wherein $R^1$ and $R^2$ are the same as mentioned above. Among the organoalkoxysilanes, methyltrihydroxysilane is preferable from the view point of hardness of a paint film and profitability. A small amount of other organoslkoxysilanes can be mixed with the organoalkoxysilane. It is preferable that at least 80% by weight of the organohydroxysilane is methyltrihydroxysilane. It is preferable that the content of the partial condensate of organoalkoxysilane hydrolyzate is 20 to 60% by weight based on the total amount of the solid components of the coating composition. When the content is less than 20% by weight, the adhesive property of the paint film to a substrate is lowered, and when the content is more than 60% by weight, the impact resistance is lowered.

Examples of the unsaturated ethylenic monomers used for the polymer of the copolymer (c) are, for instance, acrylic esters and methacrylic esters such as methyl acrylate, ethyl acrylate, 2-ethylhexyl acrylate, t-butyl acrylate, 2-hydroxyethyl acrylate, 2-hydroxypropyl acrylate, methyl methacrylate, ethyl methacrylate, n-butylmethacrylate, isobutyl methacrylate, t-butyl methacrylate, glycidyl methacrylate, 2-hydroxyethyl methacrylate, 2-hydroxypropyl methacrylate, dimethylaminoethyl methacrylate, diethylaminoethyl methacrylate, 2-ethylhexyl methacrylate, methoxydiethylene glycol acrylate, methoxydiethylene glycol methacrylate, methoxytetraethylene glycol methacrylate and allyl methacrylate. A small amount of other monomers such as styrene can be mixed with the above monomers.

It is preferable that the content of the polymer or the copolymer prepared from the unsaturated ethylenic monomers is 5 to 40% by weight based on the total amount of the solid components contained in the coating composition. When the amount is less than 5% by weight, a thick paint film having a thickness of not less than 20 μm, which is required for the wheel for vehicles, cannot be prepared, cracking caused by thermal shrinkage of the paint film and the like cannot be prevented, and the impact resistance of the paint film cannot be improved. Further, the paint film has a problem in corrosion resistance. When the content of the polymer or the copolymer is more than 40% by weight, the properties of the paint film such as hardness, scratch resistance and stain resistance are lowered.

It is preferable that the surface active agent (d) used in the coating composition of the present invention is a nonionic surface active agent. When anionic or cationic surface active agents are used in the coating composition, there is a problem in storage stability of the coating composition.

Examples of the nonionic surface active agent are, for instance, commercially available agents such as polyethylene glycols, polyhydric alcohols, polyethylene imines, acetylene alcohols, compound having fluorinated alkyl groups and silicones.

The coating property of the coating composition to the wheel for vehicles is improved by including the surface active agent into the coating composition, and thereby the workability for coating the coating composition is improved and a uniform paint film can be formed. In particular, when the coating composition is coated to a wheel for vehicles, which is produced by casting, such as a wheel for vehicles made of aluminium alloy, it is important that the surface active agent is contained in the coating composition. Since there are many uneven portions and holes on the surface of the cast, excellent coating properties are required for the coating composition. If the coating composition in which the surface active agent is not contained is coated on the cast, not only the workability for coating is deteriorated but also pin-holes generate in a formed paint film. There is a problem in corrosion resistance when the paint film has pin-holes.

It is preferable that the content of the surface active agent is 0.1 to 5.0% by weight based on the total solid components contained in the coating composition.

The solvent (e) is a member selected from the group consisting of lower aliphatic alcohols, glycol derivatives and ketone derivatives. It is indispensable that the solvent contains the glycol derivatives. It is preferable that the content of the glycol derivatives is not less than 10% by weight. When the glycol derivatives are not contained in the coating composition, not only the coating composition has a problem in storage stability but also workability for coating is deteriorated and the appearance of the paint film is deteriorated.

Examples of the lower aliphatic alcohols used in the present invention are, for instance, methanol, ethanol, propanol, isopropanol, n-butanol, t-butanol, and the like. Examples of the glycol derivatives are, for instance, ethylene glycol monoethyl ether, ethylene glycol monobutyl ether, ethylene glycol acetate monoethyl ether, and the like. Examples of the ketone derivatives are, for instance, acetone, methyl ethyl ketone, methyl isobutyl ketone, and the like. The solvent used in the present invention contains a small amount of water derived from the aqueous colloidal silica and the like.

A representative example of the process for preparing the coating composition of the present invention is as follows.

The above-mentioned organoalkoxysilane is hydrolyzed in the acidic dispersion of colloidal silica prepared by mixing the aqueous colloidal silica with the non-aqueous colloidal silica, to give a uniform dispersion of an organohydroxysilane represented by the general formula: $R^1Si(OH)_3$, wherein $R^1$ is the same as mentioned above, a partial condensate of the organohydroxysilane and a colloidal silica, to which a polymer or copolymer of unsaturated ethylenic monomers, a surface active agent and a solvent containing glycol derivatives as an indispensable component are added, and then the mixture is dispersed to give a coating composition of the present invention.

The process for preparing a coating composition of the present invention is more specifically described hereinbelow.

A reaction vessel equipped with a stirrer is charged with the aqueous colloidal silica and the non-aqueous colloidal silica and then with the organoalkoxysilane. The mixture is subjected to the reaction for about 1 to 5 hours at a temperature of 10° to 80° C. with stirring. A part of the non-aqueous colloidal silica can be added after the reaction. When the organoalkoxysilane is hydrolyzed, a small amount of catalyst can be added to the reaction mixture. However, it is preferable that the catalyst is not added to the reaction mixture.

The polymer or the copolymer of the above-mentioned unsaturated ethylenic monomers, a surface active agent and a solvent containing glycol derivatives as an indispensable component are added to the dispersion of the obtained partial condensate of the colloidal silica-organoalkoxysilane hydrolyzate, and the mixture is thoroughly dispersed and mixed together to give a coating composition of the present invention.

The solid content in the coating composition of the present invention is adjusted to be within a range of 15 to 40% by weight by adding the above-mentioned solvent. When the solid content is less than 15% by weight, it is difficult to control the thickness of the paint film and the workability for coating is lowered. When the solid content is more than 40% by weight, the storage stability of the coating composition is lowered.

Additives such as thickeners and antifoamers and coloring agents such as pigments and dyes can be added to the coating composition of the present invention as occasion demands.

The process for coating the coating composition to a wheel for vehicles and curing the composition is described hereinbelow.

First of all, the coating composition is coated to the surface of the wheel. As the methods for coating the coating composition, usual methods such as flow coating, spray coating and dip coating can be employed. The paint film is heated at a temperature of 100° to 200° C. for 10 to 30 minutes to give a paint film having excellent adhesive property to the wheel. As mentioned above, since the coating composition of the present invention is excellent in workability for coating, the usual methods for coating organic resin paints can be employed without any modifications.

The paint film formed on the surface of the wheel for vehicles is substantially composed of silica, a condensate of organohydroxysilane and a polymer or a copolymer of the unsaturated ethylenic monomers.

Examples of the substrate which can be coated with the coating composition of the present invention are, for instance, metallic materials such as aluminium, aluminium alloy, magnesium alloy, titanium alloy, iron and ferro-alloy. The coating composition is remarkably excellent in adhesive property to these substrates. Accordingly, there is no necessity that a primer coating or the like is coated on the surface of the substrate, and the formed paint film is superior in adhesive property against the substrate to conventional organic resin paints. Further, the coating composition of the present invention is effective to a substrate, in particular, a substrate which is used in the wheel for vehicles, for instance, casts or forged parts of metals such as aluminium, aluminium alloy, magnesium alloy, titanium alloy, iron and ferro-alloy.

As apparent from the following examples, the coating composition of the present invention has excellent properties, and it can be proved that the coating composition is preferably used as a coating composition for a wheel for vehicles.

The coating composition of the present invention shows the following excellent properties.

(1) The paint film of the coating composition of the present invention is excellent in corrosion resistance. Especially, there can be prevented the filiform corrosion which is conventionally caused when an organic resin paint is coated on a wheel for vehicles made of aluminium alloy.

It is thought that the reason why the coating composition of the present invention is excellent in filiform corrosion resistance is based upon that the coating composition of the present invention has an excellent adhesive property to the substrate.

(2) According to the coating composition of the present invention, the cracking caused by thermal shrinkage and the like can be prevented, and corrosion resistance and impact resistance are remarkably improved.

These improvements have been accomplished as the results that flexibility is imparted to the paint film by adding a polymer or a copolymer of the unsaturated ethylenic monomers to the partial condensate of the colloidal silical-organoalkoxysilane hydrolyzate and that the workability for coating the coating composition to a wheel for vehicles is improved and the coating composition can be easily formed into a uniform and thick paint film not having pin-holes and having excellent adhesive property to the substrate by adding the surface active agent and the solvent containing glycol derivatives as an indispensable component to the coating composition.

(3) The coating composition of the present invention is especially excellent in stain resistance and scratch resistance. Heretofore, when the wheel for vehicles is coated with an organic resin paint, the appearance of the wheel for vehicles is deteriorated since the stains scattered from brake-pads and the like are sticked to the wheel, and scratches generate in the - paint film during the car is being run or washed. When the coating composition of the present invention is coated on the wheel for vehicles, an excellent appearance of the wheel can be maintained for a long period of time.

(4) As apparent from the following examples, it is proved that the paint film of the coating composition of the present invention is sufficiently satisfied with weatherability and other properties required for the coating composition to be coated on the wheel for vehicles as well as is excellent in the above-mentioned properties required for the paint film.

. As mentioned above, the present invention provides a coating composition which can be formed into a novel paint film showing excellent properties for a long period of time and a wheel for vehicles having excellent properties which are originated from the coating composition.

The present invention is more specifically described and explained by means of the following examples, in which all % and parts are by weight unless otherwise noted. It is to be understood that the present invention is not limited to the examples, and various changes and modifications may be made in the invention without departing from the spirit and scope thereof.

[Preparation of dispersion of organohydroxysilane and colloidal silica]

PREPARATION EXAMPLE 1

An amount of 21.2 g of an acidic dispersion of aqueous colloidal silica having an average particle size of 10 to 20 m$\mu$m and a solid content of 20% and 38.8 g of a dispersion of methanolic colloidal silica having an average particle size of 10 to 20 m$\mu$m and a solid content of 30% were mixed together, and 13.9 g of methyltrimethoxysilane was added to the mixture. After the mixture was stirred at a room temperature for about 5 hours to complete the hydrolysis, to which isopropanol was added to give a dispersion having a solid content of about 20%.

PREPARATION EXAMPLE 2

An amount of 16.3 g of an acidic dispersion of aqueous colloidal silica and 9.7 g of a dispersion of methanolic colloidal silica were mixed together, and 24.5 g of methyltrimethoxysilane was added to the mixture. After the mixture was stirred at a room temperature for about 5 hours to complete the hydrolysis, to which isopropanol was added to give a dispersion having a solid content of about 20%.

PREPARATION EXAMPLE 3

The procedure of Preparation Example 1 was repeated except that 31.3 g of the acidic dispersion of aqueous colloidal silica and 28.7 g of the dispersion of methanolic colloidal silica were used to give a dispersion having a solid content of 20%.

COMPARATIVE PREPARATION EXAMPLE 1

An amount of 0.3 g of glacial acetic acid was added to 50.0 g of an acidic dispersion of the aqueous colloidal silica with cooling the dispersion at a temperature of not more than 10° C., and 14.5 g of methyltrimethoxysilane was added to the mixture. After the mixture was subjected to the hydrolysis for 5 days, to which isopropanol was added to give a dispersion having a solid content of 20%.

COMPARATIVE PREPARATION EXAMPLE 2

An amount of 40.0 g of an acidic dispersion of aqueous colloidal silica having an average particle size of 10 to 20 m$\mu$m and a solid content of 20%, 0.2 g of acetic anhydride and 32.0 g of methyltrimethoxysilane were mixed together. After the mixture was stirred for 24 hours at a temperature of 25° to 30° C. to complete the hydrolysis, to which 30.0 g of isobutanol was added as an alcohol for azeotropic removal. After water derived from the colloidal silica and a part of the alcohol were removed from the mixture at a temperature of 20° to 40° C. under a reduced pressure of 20 to 70 mmHg, isobutanol was added to the mixture to give a dispersion having a solid content of 20%.

COMPARATIVE PREPARATION EXAMPLE 3

An amount of 39.0 g of a 0.1 N aqueous solution of hydrochloric acid was added to 17.0 g of a basic dispersion of colloidal silica, and then 18.0 g of $\gamma$-glycidoxypropyltrimethoxysilane and 26.0 g of methyltrimethoxysilane were added to the mixture. After the mixture was heated at a temperature of 80° to 85° C. for about 2 hours and then was cooled, isopropanol was added to the mixture to give a dispersion having a solid content of 20%.

[Preparation of acrylic resin]

RESIN-PREPARATION EXAMPLE 1

After a mixture of 20 g of methyl methacrylate and 10 g of n-butyl methacrylate was diluted with 20 g of isopropanol and 50 g of ethylene glycol monobutyl ether, to which 0.3 g of axobisisobutyronitrile (AIBN) was added under nitrogen gas and the mixture was subjected to polymerization at 80° C. for about 6 hours to give a resinous mixture having a solid content of 30%.

RESIN-PREPARATION EXAMPLE 2

The procedure of Resin-Preparation Example 1 was repeated except that 20 g of n-butyl methacrylate and 10 g of $\gamma$-methacryloxypropyltrimethoxysilane were used to give a mixture having a resinous solid content of 30%.

RESIN-PREPARATION EXAMPLE 3

The procedure of Resin-Preparation Example 1 was repeated except that 70 g of isopropanol was used instead of 20 g of the isopropanol and 50 g of ethylene glycol monobutyl ether to give a resinous mixture having a solid content of 30%.

EXAMPLES 1 to 6

After the dispersion prepared in each of Preparation Examples 1 to 3 was mixed with the resinous mixture obtained in each of Resin-Preparation Examples 1 and 2 in an amount as shown in Table 1, to which 0.2 part of a nonionic surface active agent was added and mixed to give coating compositions of the present invention.

TABLE 1

| Ex. No. | Prep. Ex. No. (part) | Resin-Prep. Ex. No. (part) | Solid content of the composition (%) | Resin content (%) (based on the weight of the total solid components of the composition) |
|---|---|---|---|---|
| 1 | 1 (83.3) | 1 (16.7) | 21.7 | 23.1 |
| 2 | 1 (73.3) | 1 (26.7) | 22.7 | 35.3 |
| 3 | 1 (91.7) | 1 (8.3) | 20.8 | 12.0 |
| 4 | 1 (83.3) | 2 (16.7) | 21.7 | 23.1 |
| 5 | 2 (83.3) | 1 (16.7) | 21.7 | 23.1 |
| 6 | 3 (83.3) | 1 (16.7) | 21.7 | 23.1 |

COMPARATIVE EXAMPLES 1 AND 2

After the dispersion prepared in Preparation Example 1 was mixed with the resinous mixture prepared in Resin-Preparation Example 1 in an amount as shown in Table 2, to which 0.2 part of the nonionic surface active agent was added and mixed to give coating compositions.

TABLE 2

| Ex. No. | Amount of the dispersion obtained in Prep. Ex. No. 1 (part) | Amount of resin obtained in Resin-Prep. Ex. No. 1 (part) | Solid content of the composition (%) | Resin content (%) (based on the weight of the total solid components of the composition) |
|---|---|---|---|---|
| Com. Ex. 1 | 98.3 | 1.7 | 20.2 | 2.5 |
| Com. Ex. 2 | 58.3 | 41.7 | 24.2 | 51.8 |

COMPARATIVE EXAMPLE 3

An amount of 83.3 parts of the dispersion obtained in Preparation Example 1 and 16.7 parts of the resinous mixture obtained in Resin-Preparation Example 1 were mixed together to give a coating composition. A nonionic surface active agent was not added.

COMPARATIVE EXAMPLE 4

After 83.3 parts of the dispersion obtained in Preparation Example 1 and 16.7 parts of the resinous mixture obtained in Resin-Preparation Example 3 were mixed together, to which 0.2 part of the nonionic surface active agent was added and mixed to give a coating composition.

COMPARATIVE EXAMPLES 5 to 7

After the dispersion obtained in each of Comparative Preparation Examples 1 to 3 was mixed with the resinous mixture obtained in Resin-Preparation Example 1 in an amount as shown in Table 3, to which 0.2 part of a nonionic surface active agent was added to give coating compositions.

TABLE 3

| Ex. No. | Prep. Ex. No. of the dispersion (part) | Comp. Prep. Ex. No. (part) | Resin-Prep. Ex. No. (part) | Solid content of the composition (%) | Resin content (%) (based on the weight of the total solid components of the composition |
|---|---|---|---|---|---|
| Com. Ex. 3 | 1 (83.3) | — | 1 (16.7) | 21.7 | 23.1 |
| Com. Ex. 4 | 1 (83.3) | — | 3 (16.7) | 21.7 | 23.1 |
| Com. Ex. 5 | — | 1 (83.3) | 1 (16.7) | 21.7 | 23.1 |
| Com. Ex. 6 | — | 2 (83.3) | 1 (16.7) | 21.7 | 23.1 |
| Com. Ex. 7 | — | 3 (83.3) | 1 (16.7) | 21.7 | 23.1 |

[Methods for evaluating the properties of paint film and the results]

Each of the coating compositions prepared in Examples 1 to 6 and Comparative Examples 1 to 7 was sprayed onto the surface of a wheel for vehicles made of aluminium alloy, and the paint film formed on the wheel was heated to 160° C. for 20 minutes to give a cured paint film having a thickness of about 20 μm. The wheels were cut off to give test pieces having suitable sizes.

The test pieces were conducted to the following tests for evaluating the properties of the paint film The results are shown in Tables 4 and 5.

(a) Appearance of paint film
   Transparency and levelling property of a heated and cured film of the test piece was observed with the naked eyes.
(b) Adhesion
   Cross-cut test was carried out in accordance with JIS D-0202.
(c) Pencil hardness
   Pencil hardness was evaluated in accordance with JIS K-5400.
(d) Filiform corrosion resistance
   The test pieces were subjected to a salt spray test for 120 hours in accordance with JIS K-5400. After the test pieces were allowed to stand for 240 hours in the test room, changes of the paint film were observed with the naked eyes.
(e) Salt spray test
   After the test pieces were subjected to a salt spray test for 1000 hours in accordance with JIS K-5400, changes of the appearance of the paint film were observed with the naked eyes.
(f) CASS test
   After the test pieces were subjected to a CASS test for 100 hours in accordance with JIS D-0201 Appendix 2, changes of the appearance of the paint film were observed with the naked eyes.
(g) Accelerated weathering test
   After the accelerated weathering test was carried out by means of a Carbon-arc-sunshine Weather-O-Meter for 1000 hours, changes of the appearance of the paint film were observed with the naked eyes.
(h) Impact resistance test
   In accordance with the method B of JIS K-5400, a weight of 500 g was once dropped onto the surface of the paint film from a height of 20 cm by means of Du-Pont impact tester. Then, the paint film was observed with the naked eyes.
(i) Scratch resistance
   The surface of the paint film was observed with the naked eyes after the surface was rubbed with a nylon brush (reciprocation time was 200 times).
(j) Chemical resistance
   After the test pieces were dipped into a 5% HCl aqueous solution and a 5% NaOH aqueous solution, respectively, for 24 hours at a room temperature, the surface of the paint film was observed with the naked eyes.
(k) Solvent resistance
   After the the test pieces were dipped into toluene and isopropanol, respectively, for 24 hours at a room temperature, the surface of the paint film was observed with the naked eyes.
(l) Hot water resistance
   After the test pieces were dipped into hot water having a temperature of 60° C. for 1000 hours, the surface of the paint film was observed with the naked eyes.
(m) Thermal shock test
   The process that the test pieces were heated at 160° C. for 2 hours and then were dipped into water was repeated over a period of 10 times. Then, the paint film was observed with the naked eyes.
(n) Stain resistance
   (1) Coal tar test
      The paint film was stained with coal tar and then was wiped off with a cloth. The remained stain on the paint film was observed with the naked eyes.
   (2) Carbon powder test
      After carbon powder was placed onto the paint film of the test piece and the test piece was heated at 160° C. for 30 minutes, the carbon powder was wiped off. The remained stain on the paint film was observed with the naked eyes.
   (3) Braking test
      After a car equipped with the wheel coated with the coating composition of the present invention was actually run in the distance of 5000 km, the stain scattered from brake on the paint film was observed with the naked eyes.
(o) Efflorescence resitance
   The test pieces were placed in a thermohygrostat having a temperature of 50° C. and a humidity of 98% for 1000 hours, thereafter the efflorescence of the paint film on the test piece was observed with the naked eyes.
(p) Storage stability
   The coating composition was stored in a closed container at 25° C. The change in the appearance of the liquid of the coating composition (turbidity or gelation) was observed with the passage of time.

In table 4, ○ shows excellent, △ shows a little inferior, X shows inferior.

The properties of the wheel for vehicles of the present invention and the wheel for vehicles coated with an organic resin paint, an inorganic paint or an inorganic-organic composite paint are shown in Table 5.

In Table 5, ⊙ shows very excellent, the other marks show the same meanings as shown in Table 4.

TABLE 4

| Ex. No. | Resin content (%) (based on the weight of the solid components of the composition) | Appearance of paint film | Adhesion | Pencil hardness | Filiform corrosion resistance | Salt spray test | CASS test |
|---|---|---|---|---|---|---|---|
| 1 | 23.1 | Transparent | 100/100 | 6H | ○ | ○ | ○ |
| 2 | 35.3 | Transparent | 100/100 | 5H | ○ | ○ | ○ |
| 3 | 12.0 | Transparent | 100/100 | 6H | ○ | ○ | ○ |
| 4 | 23.1 | Transparent | 100/100 | 6H | ○ | ○ | ○ |
| 5 | 23.1 | Transparent | 100/100 | 6H | ○ | ○ | ○ |
| 6 | 23.1 | Transparent | 100/100 | 6H | ○ | ○ | ○ |

| Ex. No. | Accelerated weathering test | Impact resistance test | Scratch resistance | Chemical resistance 5% HCl | Chemical resistance 5% NaOH | Solvent resistance Toluene | Solvent resistance IPA |
|---|---|---|---|---|---|---|---|
| 1 | ○ | ○ | ○ | ○ | ○ | ○ | ○ |
| 2 | ○ | ○ | ○ | ○ | ○ | ○ | ○ |

TABLE 4-continued

| | | | | | | | |
|---|---|---|---|---|---|---|---|
| 3 | ○ | ○ | ○ | ○ | ○ | ○ | ○ |
| 4 | ○ | ○ | ○ | ○ | ○ | ○ | ○ |
| 5 | ○ | ○ | ○ | ○ | ○ | ○ | ○ |
| 6 | ○ | ○ | ○ | ○ | ○ | ○ | ○ |

| Ex. No. | Hot Water resistance | Thermal shock test | Stain resistance Coal tar test | Stain resistance Carbon powder test | Braking test | Efflorescence resistance | Storage stability (Samples were allowed to stand at a room temperature) |
|---|---|---|---|---|---|---|---|
| 1 | ○ | ○ | ○ | ○ | ○ | ○ | 180 days (Changes have not been observed.) |
| 2 | ○ | ○ | ○ | ○ | ○ | ○ | 180 days (Changes have not been observed.) |
| 3 | ○ | ○ | ○ | ○ | ○ | ○ | 180 days (Changes have not been observed.) |
| 4 | ○ | ○ | ○ | ○ | ○ | ○ | 180 days (Changes have not been observed.) |
| 5 | ○ | ○ | ○ | ○ | ○ | ○ | 180 days (Changes have not been observed.) |
| 6 | ○ | ○ | ○ | ○ | ○ | ○ | 180 days (Changes have not been observed.) |

| Ex. No. | Resin content (%) (based on the weight of the solid components of the composition) | Appearance of paint film | Adhesion | Pencil hardness | Filiform corrosion resistance | Salt spray test | CASS test |
|---|---|---|---|---|---|---|---|
| Com. Ex. 1 | 2.5 | Transparent | 85/100 | 7H | ○ | Δ | X |
| Com. Ex. 2 | 51.8 | Transparent | 100/100 | 3H | X | ○ | ○ |
| Com. Ex. 3 | 23.1 | Transparent | 98/100 | 6H | Δ | ○ | Δ |
| Com. Ex. 4 | 23.1 | Translucent | 90/100 | 6H | Δ | ○ | Δ |
| Com. Ex. 5 | 23.1 | Translucent | 80/100 | 6H | Δ | Δ | X |
| Com. Ex. 6 | 23.1 | Translucent | 100/100 | 5H | Δ | ○ | X |
| Com. Ex. 7 | 23.1 | Translucent | 40/100 | 4H | X | Δ | X |

| Ex. No. | Accelerated weathering test | Impact resistance test | Scratch resistance | Chemical resistance 5% HCl | Chemical resistance 5% NaOH | Solvent resistance Toluene | Solvent resistance IPA |
|---|---|---|---|---|---|---|---|
| Com. Ex. 1 | ○ | X | ○ | ○ | Δ | ○ | ○ |
| Com. Ex. 2 | Δ | ○ | Δ | ○ | ○ | Δ | ○ |
| Com. Ex. 3 | ○ | ○ | ○ | Δ | Δ | ○ | ○ |
| Com. Ex. 4 | ○ | ○ | ○ | Δ | Δ | ○ | ○ |
| Com. Ex. 5 | X | Δ | Δ | X | X | ○ | ○ |
| Com. Ex. 6 | ○ | ○ | ○ | Δ | X | ○ | ○ |
| Com. Ex. 7 | X | Δ | Δ | X | X | ○ | ○ |

| Ex. No. | Hot water resistance | Thermal shock test | Stain resistance Coal tar test | Stain resistance Carbon powder test | Braking test | Efflorescence resistance | Storage stability (Samples were allowed to stand at a room temperature) |
|---|---|---|---|---|---|---|---|
| Com. Ex. 1 | Δ | X | ○ | ○ | Δ | ○ | 180 days (Changed have not been observed.) |
| Com. Ex. 2 | ○ | ○ | X | X | X | ○ | 180 days (Changed have not been observed.) |
| Com. Ex. 3 | ○ | ○ | ○ | ○ | Δ | ○ | 180 days (Changed have not been observed.) 60 days |

TABLE 4-continued

| | | | | | | | |
|---|---|---|---|---|---|---|---|
| Com. Ex. 4 | ○ | ○ | ○ | ○ | ○ | ○ | (A little turbility was observed.) 5 days |
| Com. Ex. 5 | X | X | Δ | Δ | X | | (Gel was observed.) 20 days |
| Com. Ex. 6 | ○ | ○ | ○ | ○ | Δ | | (A little turbility was observed.) 5 days |
| Com. Ex. 7 | X | X | Δ | Δ | X | | (Gel was observed.) |

TABLE 5

| Wheel for vehicles | Pencil hardness | Filiform corrosion | Salt spray test | CASS test |
|---|---|---|---|---|
| Wheel coated with an organic resin paint | B to H | X | ○ | ○ |
| Wheel coated with an inorganic paint | 8H to 9H | ◎ | X | X |
| Wheel coated with an inorganic-organic composite paint | 6H to 7H | ○ | Δ | X |
| Wheel of the present invention | 4H to 7H | ○ | ○ | ○ |

| Wheel for vehicles | Stain resistance | | | Thermal shock test | Scratch resistance | Efflorescence resistance | Accelerated weathering test |
|---|---|---|---|---|---|---|---|
| | Coal tar test | Carbon powder test | Braking test | | | | |
| Wheel coated with an organic resin paint | X | X | X | ○ | X | ○ | Δ |
| Wheel coated with an inorganic paint | ◎ | ◎ | ◎ | X | ◎ | X | ○ |
| Wheel coated with an organic-inorganic composite paint | ○ | ○ | ○ | X | ○ | ○ | ○ |
| Wheel of the present invention | ○ | ○ | ○ | ○ | ○ | ○ | ○ |

Reasonable modification and variation are within the scope of this invention which is directed to a novel coating composition and a wheel for vehicles coated with such materials.

What is claimed is:

1. A wheel for mounting tires of a vehicle coated with a coating composition, wherein the coating composition comprises, on the basis of the total weight of the solid components of the composition,
   (a) 20 to 60% by weight of a colloidal silica,
   (b) 20 to 60% by weight of a partial condensate of organoalkoxysilane hydrolyzate,
   (c) 5 to 40% by weight of a polymer or a copolymer of unsaturated ethylenic monomers,
   (d) 0.1 to 5.0% by weight of a surface active agent and derivative as an indispensable component.
   (e) 150 to 550% by weight of a solvent containing a glycol derivative as an indispensable component.

2. The wheel of claim 1, wherein the colloidal silica is a mixture of acidic aqueous colloidal silica and non-aqueous colloidal silica, and the colloidal silica contains not less than 20% by weight of the non-aqueous colloidal silica.

3. The wheel of claim 1, wherein the organoalkoxysilane hydrolyzate is an organohydroxysilane represented by the general formula: $R^1Si(OH)_3$, wherein $R^1$ is selected from the group consisting of alkyl group having 1 to 3 carbon atoms, vinyl group, 3,4-epoxycyclohexylethyl group, γ-glycidoxypropyl group, γ-methacryloxypropyl group, γ-mercaptopropyl group and γ-chloropropyl group, which is prepared by hydrolyzing the organoalkoxysilane represented by the formula: $R^1Si(OR^2)_3$ wherein $R^1$ is the same as mentioned above and $R^2$ is an alkyl group having 1 to 3 carbon atoms for aryl groups in a dispersion of the acidic aqueous colloidal silica and the non-aqueous colloidal silica, or a partial condensate of said organohydroxysilane.

4. The wheel of claim 1, wherein said organohydroxysilane contains methyltrihydroxysilane in an amount of not less than 80% by weight.

5. The wheel of claim 1, wherein said unsaturated ethylenic monomer (c) is a monomer selected from the group consisting of acrylic esters and methacrylic esters.

6. The wheel of claim 1, wherein said surface active agent (d) is a nonionic surface active agent.

7. The wheel of claim 1, wherein said solvent (e) is a solvent selected from the group consisting of lower aliphatic alcohols, glycol derivatives and ketone derivatives, and said solvent (e) contains the glycol derivatives in an amount of not less than 10% by weight.

* * * * *